(12) United States Patent
Kelly et al.

(10) Patent No.: US 8,760,762 B1
(45) Date of Patent: Jun. 24, 2014

(54) IMAGE WAVEGUIDE UTILIZING TWO MIRRORED OR POLARIZED SURFACES

(75) Inventors: Daniel Kelly, San Jose, CA (US); Chia-Jean Wang, Palo Alto, CA (US)

(73) Assignee: Google Inc., Mountain View, CA (US)

(*) Notice: Subject to any disclaimer, the term of this patent is extended or adjusted under 35 U.S.C. 154(b) by 180 days.

(21) Appl. No.: 13/209,279

(22) Filed: Aug. 12, 2011

(51) Int. Cl.
*G02B 27/01* (2006.01)
(52) U.S. Cl.
CPC .................... *G02B 21/017* (2013.01)
USPC .......................... 359/485.05; 345/7
(58) Field of Classification Search
CPC ...... G02B 202/0178; G02B 6/00; G02B 5/30; G02F 1/011
USPC .............. 359/13, 34, 483.01, 485.01–488.01, 359/489.08–489.13, 629–633, 833, 359/838–839, 850; 345/4–9; 351/41, 158; 385/31–32; 362/19; 353/20; 349/96–103
See application file for complete search history.

(56) References Cited

U.S. PATENT DOCUMENTS

| | | | |
|---|---|---|---|
| 4,711,512 A | 12/1987 | Upatnieks | |
| 5,076,664 A | 12/1991 | Migozzi | |
| 5,093,567 A | 3/1992 | Staveley | |
| 5,539,422 A | 7/1996 | Heacock et al. | |
| 5,696,521 A | 12/1997 | Robinson et al. | |
| 5,715,337 A | 2/1998 | Spitzer et al. | |
| 5,771,124 A | 6/1998 | Kintz et al. | |
| 5,815,126 A | 9/1998 | Fan et al. | |
| 5,844,530 A | 12/1998 | Tosaki | |
| 5,886,822 A | 3/1999 | Spitzer | |
| 5,896,232 A | 4/1999 | Budd et al. | |
| 5,943,171 A | 8/1999 | Budd et al. | |
| 5,949,583 A | 9/1999 | Rallison et al. | |
| 6,023,372 A | 2/2000 | Spitzer et al. | |
| 6,091,546 A | 7/2000 | Spitzer | |
| 6,172,657 B1 | 1/2001 | Kamakura et al. | |
| 6,201,629 B1 | 3/2001 | McClelland et al. | |
| 6,204,974 B1 | 3/2001 | Spitzer | |

(Continued)

FOREIGN PATENT DOCUMENTS

| GB | 2272980 A | 6/1994 |
|---|---|---|
| WO | WO96/05533 A1 | 2/1996 |

OTHER PUBLICATIONS

Levola, Tapani, "Diffractive Optics for Virtual Reality Displays", Academic Dissertation, Joensuu 2005, University of Joensuu, Department of Physics, Vaisala Laboratory, 26 pages.

(Continued)

*Primary Examiner* — Stephone B Allen
*Assistant Examiner* — Jeffrey Madonna
(74) *Attorney, Agent, or Firm* — Blakely Sokoloff Taylor & Zafman LLP

(57) ABSTRACT

An image waveguide includes first and second reflective surfaces being substantially parallel and opposing each other. The waveguide receives light from an in-coupling region through the first reflective surface, the light received at a first angle of incidence with respect to the second reflective surface. A reflective end surface positioned at an end of the waveguide and offset from perpendicular to the first and second reflective surfaces reflects the light to a second angle of incidence with respect to the second reflective surface that is less than the first angle of incidence. The light exits through an out-coupling region disposed on the first reflective surface to output the light at the second angle of incidence from the waveguide out the first reflective surface.

25 Claims, 7 Drawing Sheets

(56) References Cited

U.S. PATENT DOCUMENTS

| | | |
|---|---|---|
| 6,222,677 B1 | 4/2001 | Budd et al. |
| 6,349,001 B1 | 2/2002 | Spitzer |
| 6,353,492 B2 | 3/2002 | McClelland et al. |
| 6,353,503 B1 | 3/2002 | Spitzer et al. |
| 6,356,392 B1 | 3/2002 | Spitzer |
| 6,384,982 B1 | 5/2002 | Spitzer |
| 6,538,799 B2 | 3/2003 | McClelland et al. |
| 6,618,099 B1 | 9/2003 | Spitzer |
| 6,690,516 B2 | 2/2004 | Aritake et al. |
| 6,701,038 B2 | 3/2004 | Rensing et al. |
| 6,724,354 B1 | 4/2004 | Spitzer et al. |
| 6,738,535 B2 | 5/2004 | Kanevsky et al. |
| 6,747,611 B1 | 6/2004 | Budd et al. |
| 6,829,095 B2 | 12/2004 | Amitai |
| 6,879,443 B2 | 4/2005 | Spitzer et al. |
| 7,158,096 B1 | 1/2007 | Spitzer |
| 7,242,527 B2 | 7/2007 | Spitzer et al. |
| 7,391,573 B2 | 6/2008 | Amitai |
| 7,457,040 B2 | 11/2008 | Amitai |
| 7,576,916 B2 | 8/2009 | Amitai |
| 7,577,326 B2 | 8/2009 | Amitai |
| 7,643,214 B2 | 1/2010 | Amitai |
| 7,663,805 B2 | 2/2010 | Zaloum et al. |
| 7,672,055 B2 | 3/2010 | Amitai |
| 7,724,441 B2 | 5/2010 | Amitai |
| 7,724,442 B2 | 5/2010 | Amitai |
| 7,724,443 B2 | 5/2010 | Amitai |
| 7,747,113 B2 * | 6/2010 | Mukawa et al. ............ 359/17 |
| 7,843,403 B2 | 11/2010 | Spitzer |
| 7,900,068 B2 | 3/2011 | Weststrate et al. |
| 8,004,765 B2 | 8/2011 | Amitai |
| 8,243,230 B2 * | 8/2012 | Oversluizen et al. ........ 349/63 |
| 2003/0090439 A1 | 5/2003 | Spitzer et al. |
| 2005/0174651 A1 | 8/2005 | Spitzer et al. |
| 2006/0192306 A1 | 8/2006 | Giller et al. |
| 2006/0192307 A1 | 8/2006 | Giller et al. |
| 2007/0071389 A1 * | 3/2007 | Yoon et al. .................. 385/37 |
| 2008/0219025 A1 | 9/2008 | Spitzer et al. |
| 2009/0122414 A1 | 5/2009 | Amitai |
| 2010/0046070 A1 | 2/2010 | Mukawa |
| 2010/0103078 A1 | 4/2010 | Mukawa et al. |
| 2010/0149073 A1 | 6/2010 | Chaum et al. |
| 2010/0277803 A1 * | 11/2010 | Pockett et al. ............. 359/567 |
| 2010/0278480 A1 | 11/2010 | Vasylyev et al. |
| 2011/0213664 A1 | 9/2011 | Osterhout et al. |
| 2012/0050044 A1 * | 3/2012 | Border et al. ................. 345/8 |

OTHER PUBLICATIONS

Mukawa, Hiroshi et al., "Distinguished Paper: A Full Color Eyewear Display using Holographic Planar Waveguides", SID Symposium Digest of Technical Papers—May 2008—vol. 39, Issue 1, pp. 89-92.

* cited by examiner

US 8,760,762 B1

IMAGE WAVEGUIDE UTILIZING TWO MIRRORED OR POLARIZED SURFACES

TECHNICAL FIELD

This disclosure relates generally to the field of optics, and in particular but not exclusively, relates to near-to-eye optical systems.

BACKGROUND INFORMATION

A head mounted display ("HMD") is a display device worn on or about the head. HMDs usually incorporate some sort of near-to-eye optical system to display an image within a few centimeters of the human eye. Single eye displays are referred to as monocular HMDs while dual eye displays are referred to as binocular HMDs. Some HMDs display only a computer generated image ("CGI"), while other types of HMDs are capable of superimposing CGI over a real-world view. The former type of HMD is often referred to as virtual reality while latter type of HMD is often referred to as augmented reality because the viewer's image of the world is augmented with an overlaying CGI, also referred to as a heads-up display ("HUD").

HMDs have numerous practical and leisure applications. Aerospace applications permit a pilot to see vital flight control information without taking their eye off the flight path. Public safety applications include tactical displays of maps and thermal imaging. Other application fields include video games, transportation, and telecommunications. There is certain to be new found practical and leisure applications as the technology evolves; however, many of these applications are limited due to the cost, size, field of view, and efficiency of conventional optical systems used to implement existing HMDs.

SUMMARY

Implementations of techniques, apparatuses, and systems are provided for an image waveguide for use in a heads-up-display capable of providing a virtual reality or an augmented reality to a user. In one aspect, an optical apparatus includes an image waveguide having first and second reflective surfaces being substantially parallel and opposing each other; an in-coupling region for receiving light into the waveguide through the first reflective surface, the light received at a first angle of incidence with respect to the second reflective surface; a reflective end surface positioned at an end of the waveguide and offset from perpendicular to the first and second reflective surfaces to reflect the light to a second angle of incidence with respect to the second reflective surface that is less than the first angle of incidence; and an out-coupling region disposed on the first reflective surface to output the light at the second angle of incidence from the waveguide out the first reflective surface.

These and other aspects and embodiments are described in detail in the drawings, the description, and the claims.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. It should be appreciated that the following figures may not be drawn to scale.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

Embodiments of an apparatus, system and method to utilize a waveguide having two mirrored or polarized surfaces are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
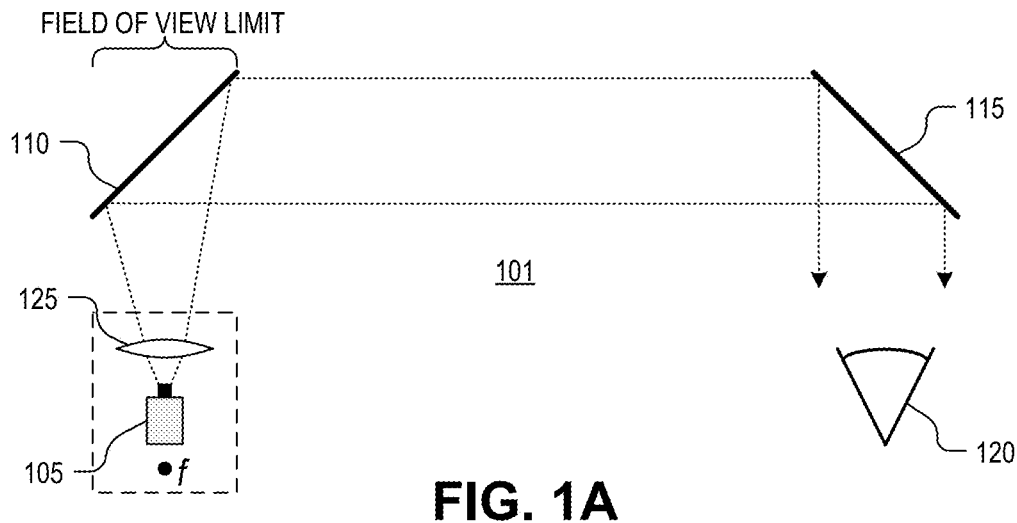
FIG. 1A illustrates a first conventional near-to-eye optical system using an input lens and two mirrors.

FIG. 1A illustrates a first conventional near-to-eye optical system 101 using an input lens and two mirrors according to an embodiment of the disclosure. An image source 105 outputs an image that is reflected by two mirrors 110 and 115, which form an image near to eye 120. Image source 105 is typically mounted above the head or to the side of the head, while mirrors 110 and 115 bend the image around the front of the viewer's face to their eye 120. Since the human eye is typically incapable of focusing on objects placed within a few centimeters, this system requires a lens 125 interposed between the first mirror 110 and image source 105. Lens 125 creates a virtual image that is displaced further back from the eye than the actual location of mirror 115 by positioning image source 105 inside of the focal point f of lens 125. Optical system 101 suffers from a relatively small field of view (e.g., approximately 20 degrees) limited by the extent of mirrors 110 and 115 and the bulkiness of lens 125. The field of view can be marginally improved by placing mirrors 110 and 115 within a high index material to compress the angles of incidence, but is still very limited and the thickness of the waveguide rapidly increases to achieve larger fields of view.

Figure 1B:
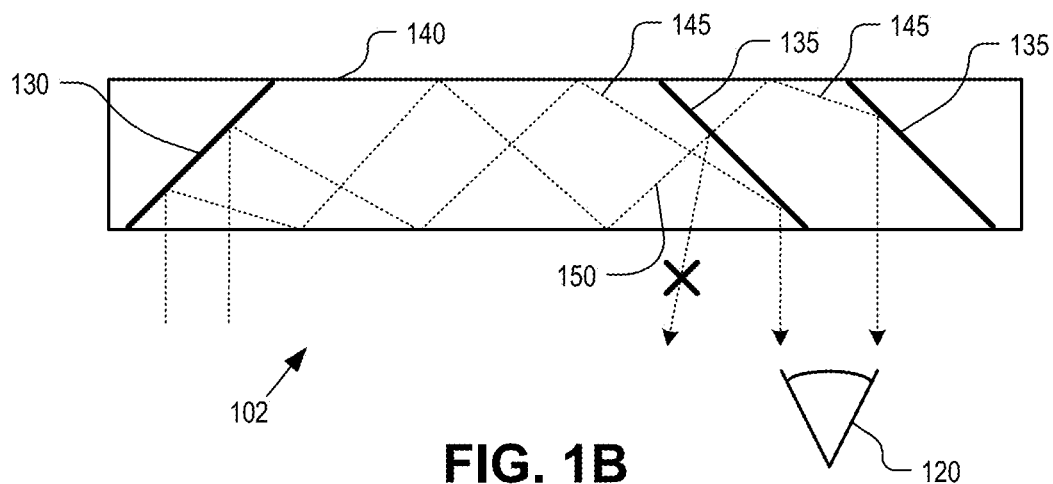
FIG. 1B illustrates a second conventional near-to-eye optical system using angle sensitive dichroic mirrors.

FIG. 1B illustrates a second conventional near-to-eye optical system 102 using angle sensitive dichroic mirrors according to an embodiment of the disclosure. Optical system 102 includes a single in-coupling mirror 130 and two out-coupling dichroic mirrors 135 disposed within a waveguide 140. This system uses collimated input light from virtual images placed at infinity. In order to produce a useful image at eye 120, each incident angle of input light should correspond to a single output angle of emitted light. Since light can potentially reflect off of output mirrors 135 on either a downward trajectory (ray segments 145) or an upward trajectory (ray segments 150), each input angle can potentially result in multiple output angles, thereby destroying the output image. To overcome this problem, optical system 102 uses angle sensitive dichroic mirrors 135 that pass light with incident sufficiently close to normal while reflecting light having a sufficiently oblique incidence. However, the nature of dichroic mirrors 135 that passes some incident angles while reflecting others limits the field of view optical system 102 and the dichroic mirror coating does not provide sharp angular cutoffs, resulting in ghosting effects.

Figure 1C:
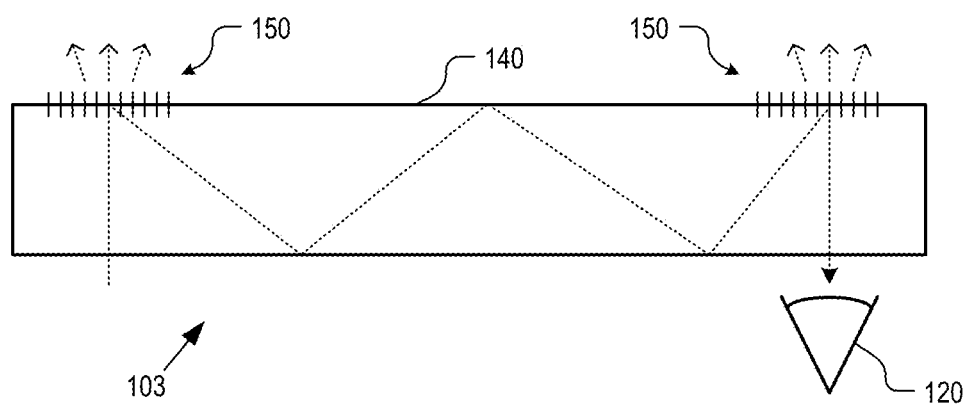
FIG. 1C illustrates a third conventional near-to-eye optical system using holographic diffraction gratings.

FIG. 1C illustrates a third conventional near-to-eye optical system 103 using holographic diffraction gratings. Optical system 103 is similar to optical system 102, but uses holographic diffraction gratings 150 in place of mirrors 130 and 135. Diffraction gratings 150 are inefficient reflectors, since they only reflect higher order diffractions while passing the first order diffraction, which contains the largest portion of energy in an optical wave front. In addition to being poor optical reflectors, the input and output diffraction gratings must be precisely tuned to one another, else the output image will suffer from color separation. Achieving a sufficient match between the input and output gratings 150 requires extreme control over manufacturing tolerances, which is often difficult and costly. Again, optical system 103 suffers from a limited field of view.

Figure 2:
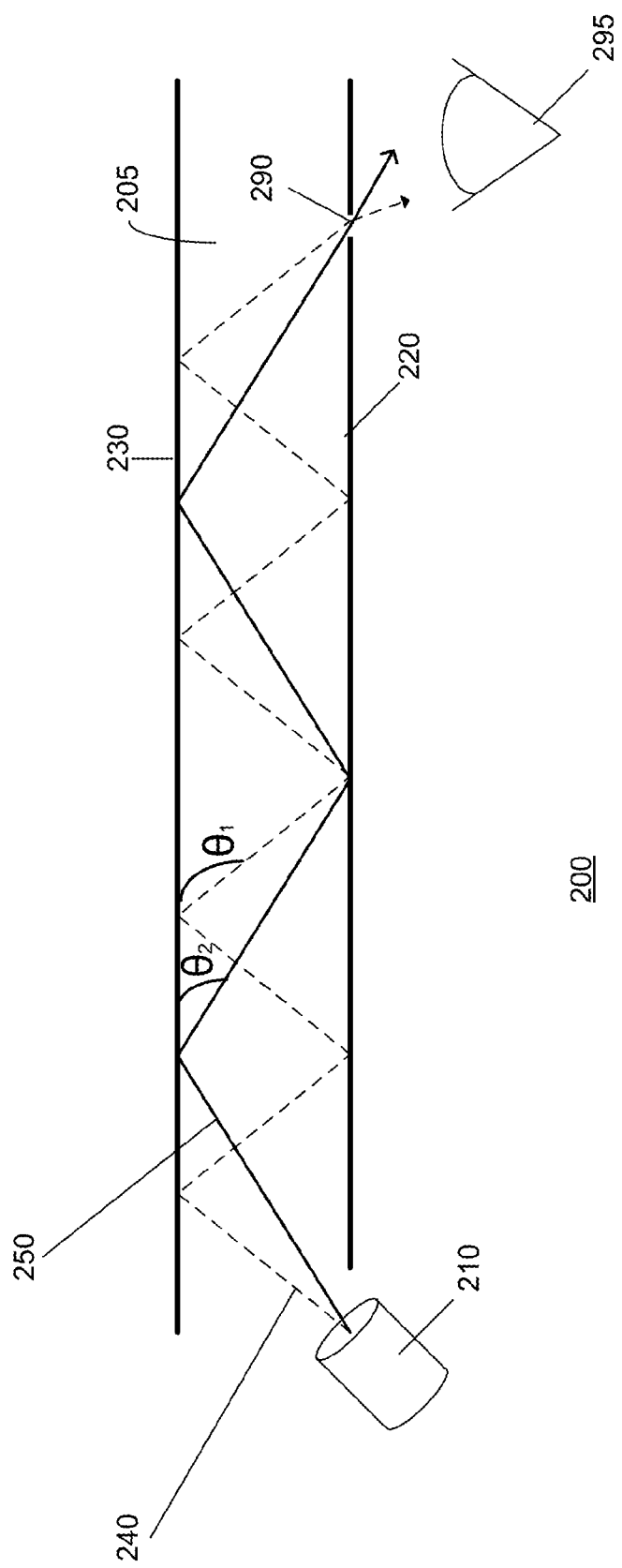
FIG. 2 illustrates a waveguide in accordance with an embodiment of the disclosure.

FIG. 2 illustrates a waveguide in accordance with an embodiment of the disclosure. The illustrated embodiment is a cross-sectional view on an image waveguide for generating a near-to-eye image. Waveguide 200 receives light from light source 210, which is propagated through the waveguide via surfaces 220 and 230. Said reflective surfaces enclose waveguide core 205, which may comprise air, glass, quartz, plastic, or any other optically transparent material. Waveguide 200 may be fabricated as a single piece diamond turned or injection molded waveguide structure, or a multi-component waveguide structure that is assembled.

In this illustration, light beam path 240 is shown to enter waveguide 200 and strike surface 230 with a sufficiently oblique angle, $\theta_1$, such that the image is guided via total internal reflection ("TIR") within the waveguide. Guided by Snell's Law, TIR occurs when light travels within a medium with a higher refractive index surrounded by a lower refractive index (e.g., from glass to air).

When light is coupled into waveguide 200 using light beam path 240 to utilize TIR, if the light is not assertively coupled out of the waveguide it continues propagating along the waveguide. One technique for emitting guided light from waveguide 200 is to include out-coupling region 290 that permits the light to exit; however, the emission angle of light 240 from out-coupling region 290 may not be desirable for coupling into a user eye 295 when waveguide 200 is used in connection with a head mounted display. If light 240 is coupled into waveguide 200 at the steepest angle (angle $\theta_1$) permitted by TIR, then the number of side to side reflections for light 240 to reach out-coupling region 290 is increased. Alternatively, light beam path 240 may be described to have a small "angle of incidence"—i.e., the angular difference from normal, is small. Due to practical limitations in fabrication and composition, each reflection has an associated loss which may arise from finite extinction coefficients, material absorption or scatter effects at the media interface. Accordingly, if a shallower angle (angle $\theta_2$) is used, such as with light 250, then light 250 reaches out-coupling region 290 with fewer reflections and less power loss; however, the emission angle associated with light 250 may not be desirable.

In one embodiment, surfaces 220 and 230 are disposed in parallel and comprise a reflective layer, such that TIR is not required to propagate light through the waveguide. As shown in the illustrated embodiment, because light 250 enters the waveguide at a shallower angle than light beam path 240, it reaches out-coupling region 290 with less reflections off of surfaces 220 and 230. Furthermore, because TIR is not being utilized, it is to be understood that angle $\theta_2$ is not restricted to any value range, as long as it reflects off of surfaces 220 and 230 and reaches out-coupling region 290. Out-coupling region may be an optically transmissive region that allows light 250 to leave waveguide 200.

Embodiments of the disclosure such as waveguide 200 may be used in a single eye display (i.e., a monocular HMD) or a dual eye display (i.e., a binocular HMDs). Waveguide 200 may be used to display only a CGI (i.e., a virtual reality (VR) system) wherein at least reflective surface 230 is fabricated with a non-optically transmissive material—e.g., a reflective metal film, such as, aluminum, silver, nickel, gold, chromium, tin, or otherwise. In one embodiment, reflective surfaces 220 and 230 are fabricated using a dichroic film, which enables wavelength selectivity for specific transmission and reflection behavior.

Waveguide 200 may also be used in an HMD capable of superimposing CGI over a real-world view (i.e., an augmented reality (AR) system) where the user's image of the world is augmented with an overlaying CGI, also referred to as a heads-up display (HUD). For HUDs, both reflective surfaces 220 and 230 are partially transparent and partially reflective.

In embodiments where waveguide 200 is fabricated with an optically transmissive, light guiding material, a wire-grid polarizer may be used. A wire-grid polarizer includes an array of wires placed in a plane. Electromagnetic waves which have a polarization component of their electric fields aligned parallel to the wires induce the movement of electrons along the length of the wires and reflect this component of the incident light. The polarization component that is perpendicular to the wires passes through the wire-grid polarizer substantially unaffected. Thus, a wire-grid polarizer permits some ambient external light to pass through waveguide 200 into eye 295 of a user, while allowing the CGI to augment a real-world view to produce AR.

In the embodiment shown in FIG. 2, light 250 is shown to exit waveguide 200 via out-coupling region 290 at the same angle it entered the waveguide. Out-coupling region 290 may be an opening, diffraction grating, non-reflective optically transmissive region, or any functionally equivalent means to allow light to exit waveguide 200. It is to be understood having light 250 exit the waveguide in this manner (i.e., via a single opening and at a shallow angle) causes the eyebox for a user to be very narrow (i.e., eye 295 must be position precisely to receive light 250) and the shallow angle of the light may require additional external optics to bend the light into the user's eye 295.

Figure 3:
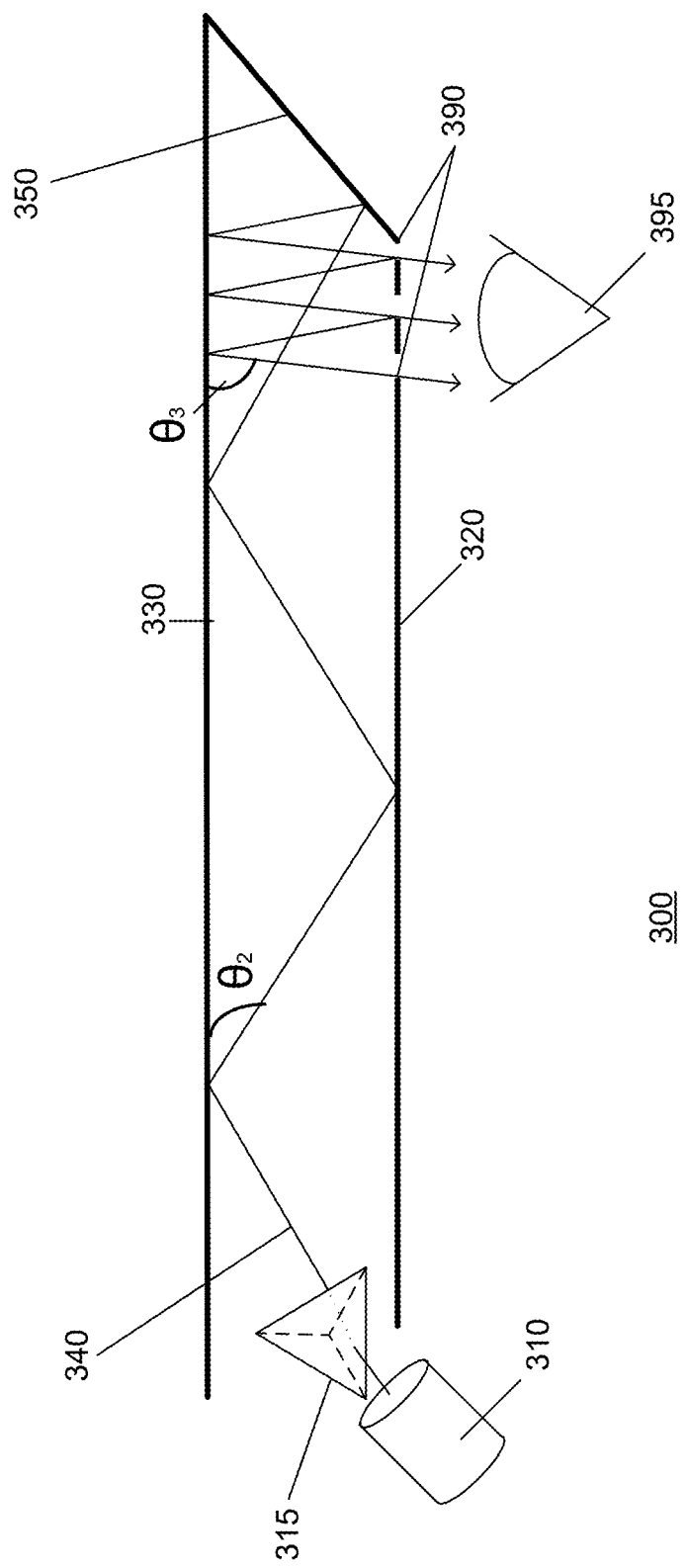
FIG. 3 illustrates a waveguide with a reflective end surface in accordance with an embodiment of the disclosure.

FIG. 3 illustrates a waveguide with a reflective end surface in accordance with an embodiment of the disclosure. The illustrated embodiment is a cross-sectional view on an image waveguide for generating a near-to-eye image. In this embodiment, waveguide 300 receives light 340 having a shallow angle $\theta_2$ from image source 310. Prism 315 is used to couple light 340 into waveguide 300 by changing the surface of the in-coupling region of waveguide 300 so that light 340 enters the waveguide. In other embodiments, the in-coupling region of waveguide 300 may be a grating or an edge of the waveguide. As described above, surfaces 320 and 330 are at least partially reflective and are positioned in parallel such that light 340 may propagate through waveguide 300 at shallow angle $\theta_2$ thereby reducing the number of reflections to reach out-coupling region 390.

In this embodiment, waveguide 300 includes reflective backend surface 350, offset from perpendicular to surfaces 320 and 330, to change the angle of light 340 prior to the light exiting the waveguide via out-coupling region 390. Reflective backend surface 350 may be fabricated with a reflective metal material, such as, aluminum, silver, nickel, gold, chromium, tin, or otherwise. In this embodiment, out-coupling region 390 is disposed between the in-coupling region of waveguide 300 and reflective backend surface 350. In this embodiment, the value of angle $\theta_2$ is such that light 340 passes over out-coupling region 390 along the forward propagation path and strikes reflective backend surface 350, which is disposed further along waveguide 300. Reflective backend surface 350 is offset from perpendicular to surfaces 320 and 330 such that light 340 strikes out-coupling region 390 and changes its angle along the reverse propagation path. The angle of the light reflected off backend surface 350 with respect to the surfaces 320 and 330, shown here as $\theta_3$, is larger than $\theta_2$—i.e., closer to normal. Thus, light 340 does not pass over out-coupling region 390 on the reverse propagation path, but rather exits through out-coupling region 390 at an angle closer to normal, which provides better geometry for directing light 340 into eye 395.

Out-coupling region 390 may allow some of light 340 to leave waveguide 300 when it first reaches the out-coupling region, and reflect the rest of the light to surface 330. This partial reflection may occur several times, thereby spreading the emission of light 340 over multiple exit locations. This spreading mechanism expands the eyebox for a user (i.e., allow eye 395 to be positioned in various locations and still receive image data light from out-coupling region 395).

Figure 4:
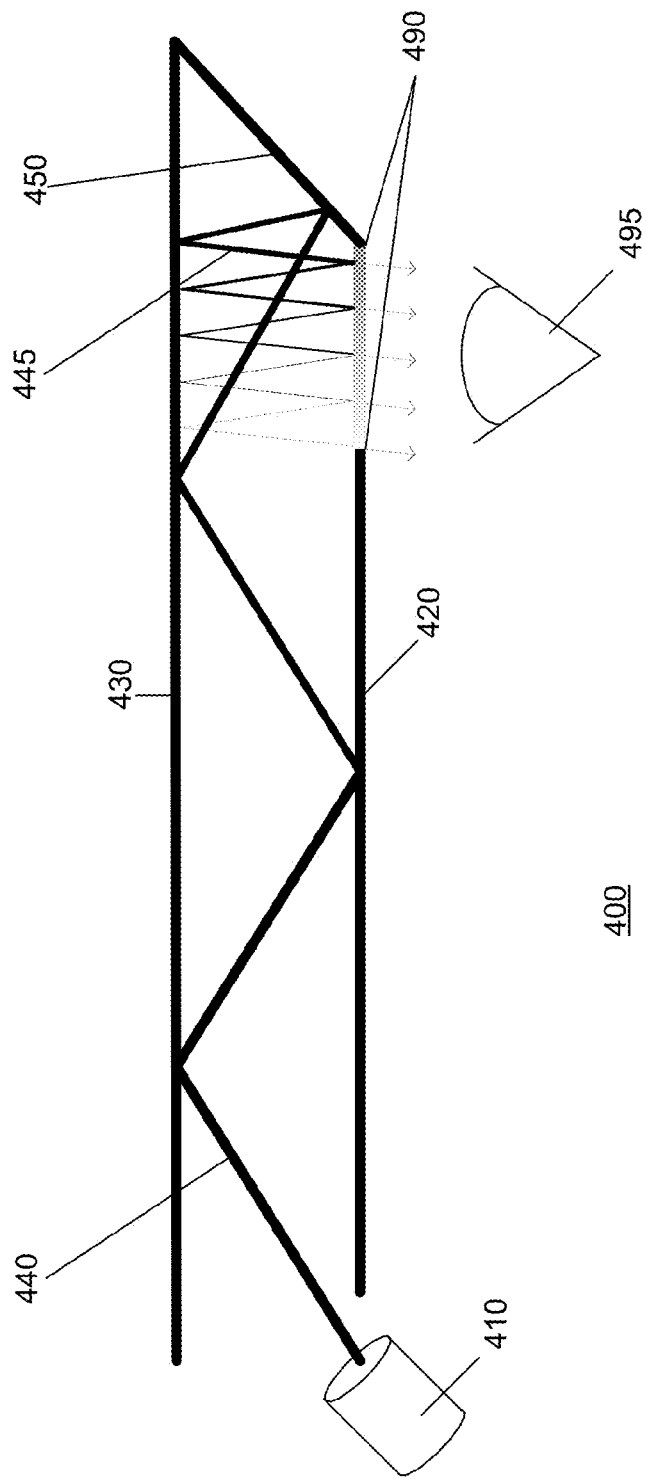
FIG. 4 illustrates a waveguide with an expanded out-coupling region in accordance with an embodiment of the disclosure.

FIG. 4 illustrates a waveguide with an expanded out-coupling region in accordance with an embodiment of the disclosure. The illustrated embodiment is a cross-sectional view on an image waveguide for generating a near-to-eye image. In this embodiment, waveguide 400 includes parallel and reflective surfaces 420 and 430 such that light 440 from light source 410 may propagate through the waveguide along the forward propagation path at a shallow angle with respect to surfaces 420 and 430 (i.e., a large angle of incidence). Light 440 is propagated at an angle such that it bridges or passes over out-coupling region 490 along the forward propagation path. Waveguide 400 includes reflective end surface 450 to change the angle of light 440 closer to normal (shown as light 445) and such that light 445 is angled to exit the waveguide via out-coupling region 490 along the reverse propagation path and is received by user eye 495 at an angle close to normal.

Out-coupling region 490 partially reflects a portion of light 440 to surface 430 and passes the remaining portion of the light to user eye 495; said reflected portion of the light is again partially reflected/passed from out-coupling region 490, and so on until all the light has left the waveguide.

In this embodiment, out-coupling region 490 is designed such that the light that exits the region at different positions along out-coupling region 490 has a substantially constant intensity. This may be done by configuring out-coupling region 490 to progressively allow more light to leave with greater separation distance from reflective end surface 450, accounting for the loss of intensity of light 440 due to reflection, and due to each portion of the light that is emitted from waveguide 400 with each reflection from side 420 along the reverse propagation path.

Figure 5:
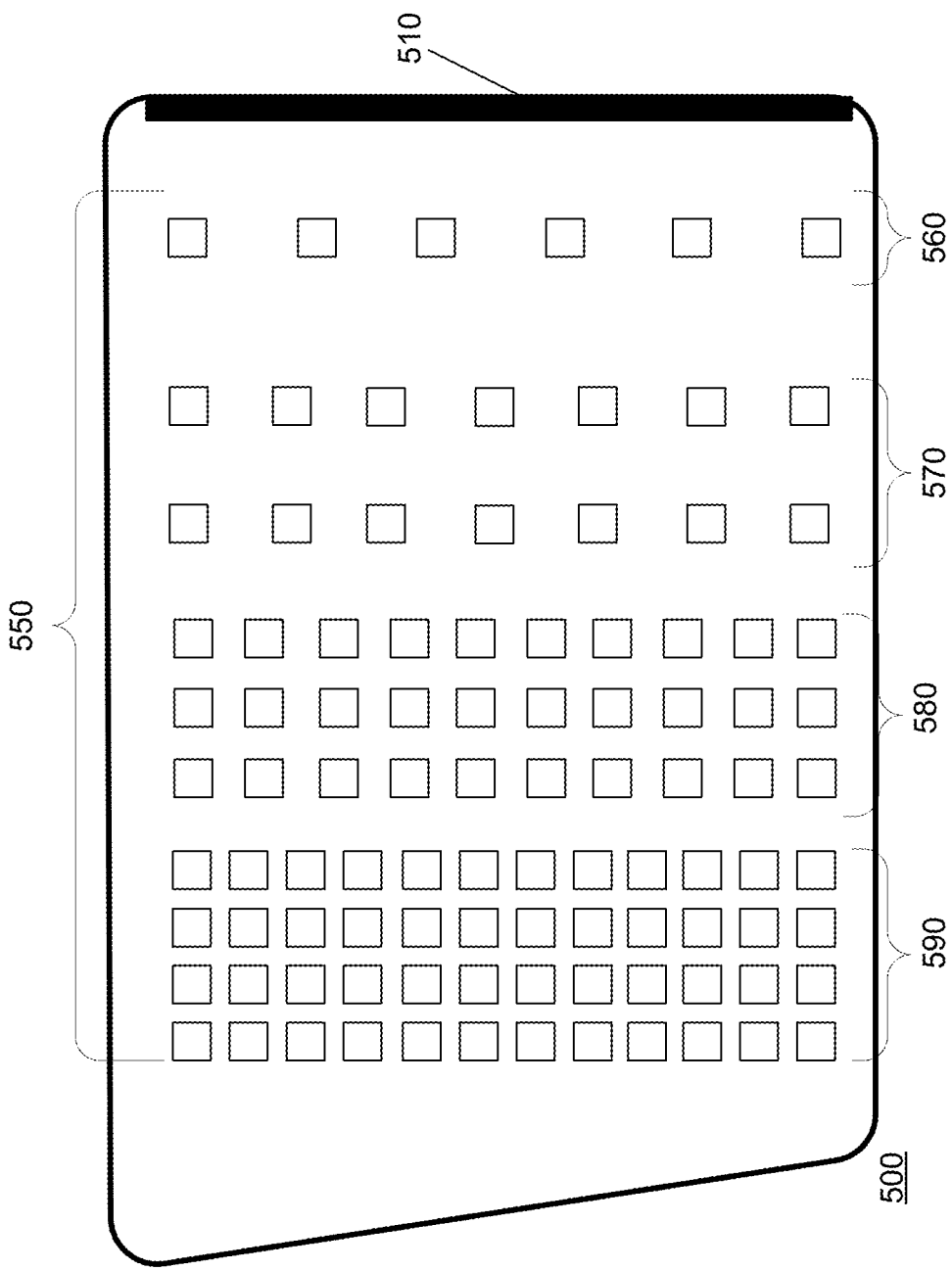
FIG. 5 illustrates an expanded out-coupling region for a waveguide in accordance with an embodiment of the disclosure.

FIG. 5 illustrates an expanded out-coupling region for a waveguide in accordance with an embodiment of the disclosure. In this embodiment, out-coupling region 500 is illustrated as a front view and includes array of openings 550 that permit light to exit a waveguide including the out-coupling region. Array of openings 550 creates an eyebox that outputs a substantially uniform intensity of light, due to the variations of density of its openings. As described above, the reverse propagating light loses intensity with each reflection along out-coupling region 500 further from reflective end surface 510. In this embodiment, the openings in array 550 are pattered so that intensity is equal throughout the eyebox region.

The intensity of the exiting light is a function of the size and density of the openings in the out-coupling region. In this embodiment array of openings 550 are arranged in patterns such that the density of openings of each pattern increases as the distance from the pattern to reflective end surface 510 increases. Thus, patterns 560, 570, 580 and 590 increase in density because they increase in their respective distance from reflective end surface 510.

Other variations in the openings of array 550 may create an eyebox that outputs a substantially uniform intensity of light. In another embodiment, the size of each of the openings in array 550 is proportional to its distance from reflective surface 510, while the spacing between each opening remains relatively constant. In another embodiment, a combination of the size and the density of each of the openings in array 550 varies based on its distance from reflective end surface 510.

Figure 6:
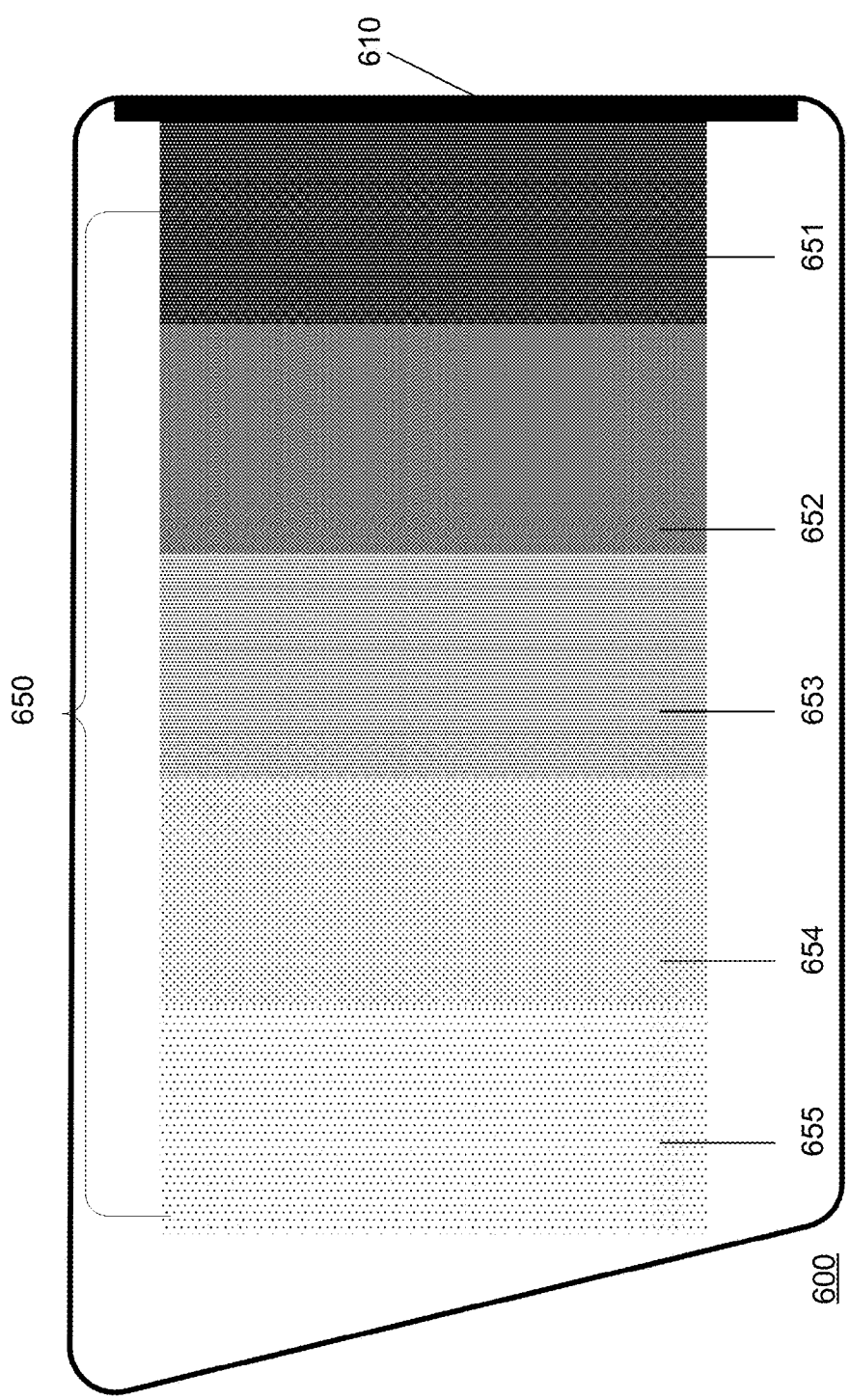
FIG. 6 illustrates an expanded out-coupling region for a waveguide in accordance with embodiment of the disclosure.

FIG. 6 illustrates an expanded out-coupling region for a waveguide in accordance with embodiment of the disclosure. In this embodiment, out-coupling region 600 is illustrated as a front view and includes partially reflective area 650, which includes a plurality of partially reflective regions 651, 652, 653, 654 and 655. In this embodiment, partially reflective area 650 creates an eyebox that outputs a substantially uniform intensity of light, due to the variations of reflectivity in regions 651-655; region 651 reflects more light than it allows to exit, and each successive region progressively reflects less light and permits a greater percentage of the light to exit until region 655, which allows all light it receives to exit.

Thus, the reflectivity of each of regions 651-655 is inversely proportional to a distance from reflective end surface 610 and regions 651-655 are designed to decrease in reflectivity because they increase in their respective distance from reflective surface 610. This may be done, for example, through variations in the layer thickness of reflective material disposed on each region or otherwise.

Figure 7:
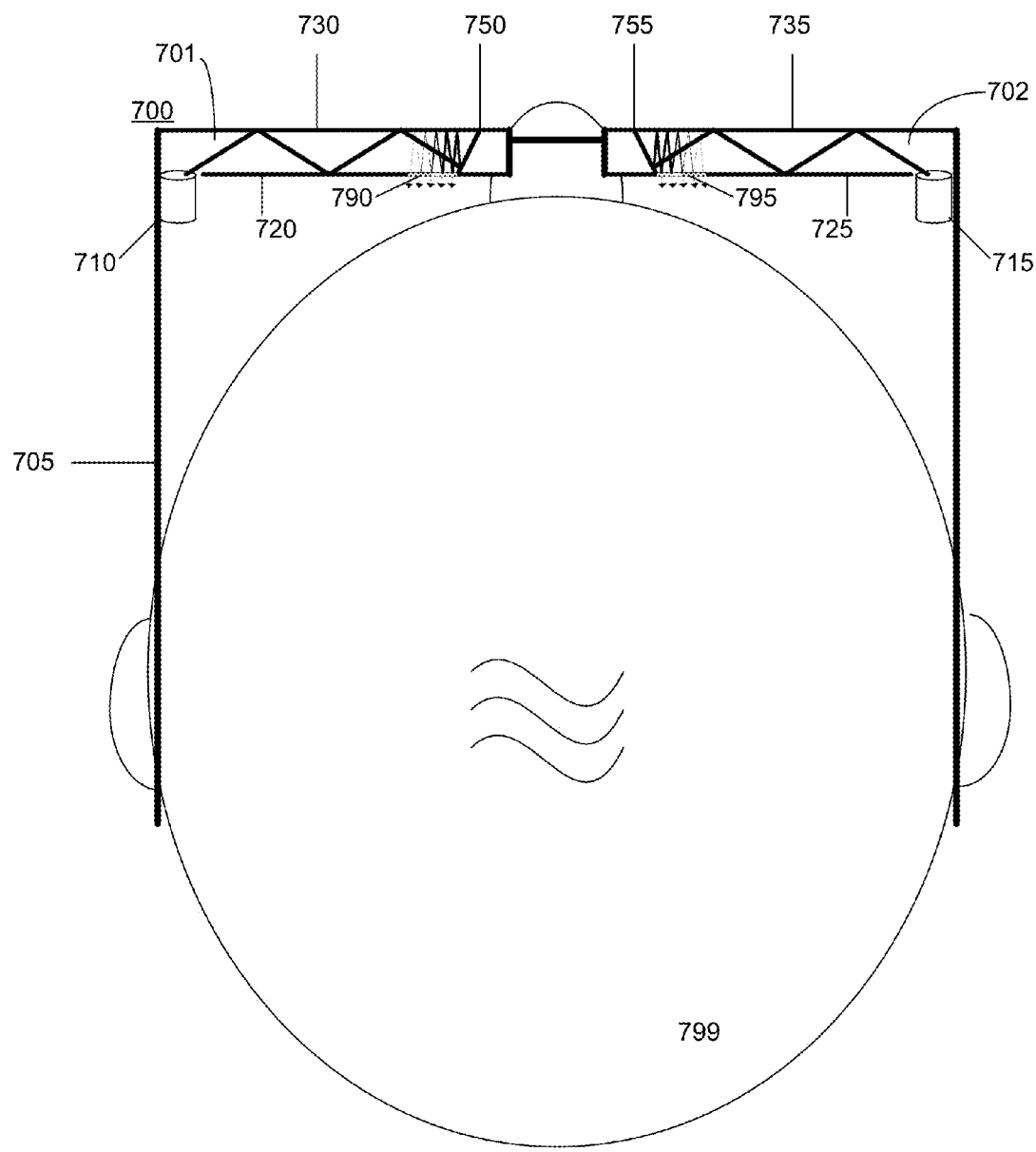
FIG. 7 is a top view of a demonstrative near-to-eye imaging system in accordance with an embodiment of the disclosure.

FIG. 7 is a top view of a demonstrative near-to-eye imaging system in accordance with an embodiment of the disclosure. The illustrated embodiment of imaging system 700 includes two image waveguides 701 and 702, frame 705 including a nose assembly, a left ear assembly, and a right ear assembly, and two image sources 710 and 715.

In this embodiment, image waveguides 701 and 702 are secured into an eye glass arrangement that can be worn on head 799 of a user. The left and right ear assemblies rest over the user's ears while the nose assembly rests over the user's nose. The frame assembly is shaped and sized to position out-coupling regions 790 and 795 of each image waveguide in front of a corresponding eye of the user with the emission surfaces facing the eyes.

Left and right (binocular embodiment) CGIs are generated by image sources 710 and 715, respectively. In one embodiment, image sources 710 and 715 utilize an independent lamp source and a reflective display (e.g., liquid crystal on silicon ("LCoS")). Of course, other display technologies may be used such as back lit LED displays, quantum dot arrays, organic LED displays, etc. The CGI output by image sources 710 and 715 is launched into their respective image waveguides, 701 and 702, guided through the intermediate regions of said waveguides via reflective parallel surfaces (720 and 730 for waveguide 701, 725 and 735 for waveguide 702), and emitted from out-coupling regions 790 and 795 near to the user's eyes. In other embodiments, a single image source may generate the above described left and right CGIs (e.g., the single image source may be placed near the nose assembly of frame 705, or signals from the single image source may be optically routed to the each of the user's eyes).

Waveguides 701 and 702 propagate light at a shallow angle, as described above. The angle of the light is increased so that it is closer to normal prior to exiting waveguides 701 and 702, due to reflective end surfaces 750 and 755, respectively. In one embodiment, image waveguides 701 and 702 emit substantially collimated CGI light and therefore virtually project the image at or near infinity. Although the human eye is typically incapable of bringing objects within a few centimeters into focus, since the output light is virtually displayed at or near infinity, the image is readily in focus.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An optical apparatus comprising:
   a waveguide including first and second reflective surfaces being substantially parallel and opposing each other;
   an in-coupling region for receiving light into the waveguide through the first reflective surface, the waveguide to guide the light along an optical propagation path disposed at least partially between the first and second reflective surfaces, the light received at a first angle of incidence with respect to the second reflective surface;
   a reflective end surface positioned at an end of the waveguide and offset from perpendicular to the first and second reflective surfaces to reflect the light from the second reflective surface back to the second reflective surface along a reverse propagation path away from the reflective end surface at a second angle of incidence with respect to the second reflective surface that is less than the first angle of incidence; and
   an out-coupling region disposed on the first reflective surface to output the light along the reverse propagation path at the second angle of incidence from the waveguide out the first reflective surface.

2. The optical apparatus of claim 1, wherein the first and second reflective surfaces each comprise a reflective polarizer.

3. The optical apparatus of claim 2, wherein the reflective polarizers of the first and second reflective surfaces each comprise wire grid polarizers.

4. The optical apparatus of claim 1, wherein the second reflective surface comprises a metallic reflective surface.

5. The optical apparatus of claim 4, wherein the first reflective surface comprises a metallic reflective surface and the out-coupling region comprises a plurality of partially reflective regions, and the reflectivity of each region is inversely proportional to a distance from the region to the reflective surface.

6. The optical apparatus of claim 1, wherein the waveguide further includes a waveguide core comprising air.

7. The optical apparatus of claim 1, wherein the waveguide further includes a waveguide core comprising an optically transparent material.

8. The optical apparatus of claim 1, wherein the out-coupling region comprises an array of openings disposed in the first reflective surface to permit the light to exit the waveguide.

9. The optical apparatus of claim 8, wherein a size of each of the openings of the array is proportional to a distance from the opening to the reflective end surface.

10. The optical apparatus of claim 8, wherein the array of openings is arranged in a pattern such that a density of the openings increases with a separation distance from the reflective end surface.

11. The optical apparatus of claim 1, wherein the out-coupling region is disposed between the in-coupling region and the reflective end surface.

12. The optical apparatus of claim 1, wherein the in-coupling region comprises at least one of a prism, a grating, and an edge of the waveguide to couple the light into the waveguide.

13. A head mounted display for rendering an augmented reality to a user, the head mounted display comprising:
   a waveguide including:
      first and second reflective surfaces being substantially parallel and opposing each other;
      an in-coupling region for receiving light into the waveguide through the first reflective surface, the waveguide to guide the light along an optical propagation path disposed at least partially between the first and second reflective surfaces, the light received at a first angle of incidence with respect to the second reflective surface;
      a reflective end surface positioned at an end of the waveguide and offset from perpendicular to the first and second reflective surfaces to reflect the light from the second reflective surface back to the second reflective surface along a reverse propagation path away from the reflective end surface at a second angle of incidence with respect to the second reflective surface that is less than the first angle of incidence; and
      an out-coupling region disposed on the first reflective surface to output the light along the reverse propagation path at the second angle of incidence from the waveguide out the first reflective surface;

an image source positioned to launch a computer generated image into the in-coupling region of the waveguide; and a frame assembly to support the waveguide and the image source for wearing on a head of the user.

14. The head mounted display of claim 13, wherein the first and second reflective surfaces each comprise a reflective polarizer to permits at least a portion of external ambient light to pass through the waveguide.

15. The head mounted display of claim 14, wherein the reflective polarizers of the first and second reflective surfaces each comprise wire grid polarizers.

16. The head mounted display of claim 13, wherein the second reflective surface comprises a metallic reflective surface.

17. The head mounted display of claim 16, wherein the first reflective surface comprises a metallic reflective surface and the out-coupling region comprises a plurality of partially reflective regions, and the reflectivity of each region is inversely proportional to a distance from the region to the reflective end surface.

18. The head mounted display of claim 16, wherein the out-coupling region is disposed between the in-coupling region and the reflective end surface.

19. The head mounted display of claim 16, wherein the in-coupling region comprises at least one of a prism, a grating, and an edge of the waveguide to couple the light into the waveguide.

20. The head mounted display of claim 13, wherein the waveguide further includes a waveguide core comprising air.

21. The head mounted display of claim 13, wherein the waveguide further includes a waveguide core comprising an optically transparent material.

22. The head mounted display of claim 13, wherein the out-coupling region comprises an array of openings disposed in the first reflective surface to permit the light to exit the waveguide.

23. The head mounted display of claim 22, wherein the size of each of the openings of the array is proportional to a distance from the opening to the reflective end surface.

24. The head mounted display of claim 22, wherein the array of openings are arranged in a pattern, such that a density of the openings increases with a separation distance from the reflective end surface.

25. The head mounted display of claim 13, wherein the head mounted display comprises a binocular head mounted display, the head mounted display further comprising:

an additional waveguide; and an additional image source positioned to launch a computer generated image into an in-coupling region of the additional waveguide, the frame assembly to support the waveguides and the image sources for wearing on the head of the user.

* * * * *